Patented June 19, 1951

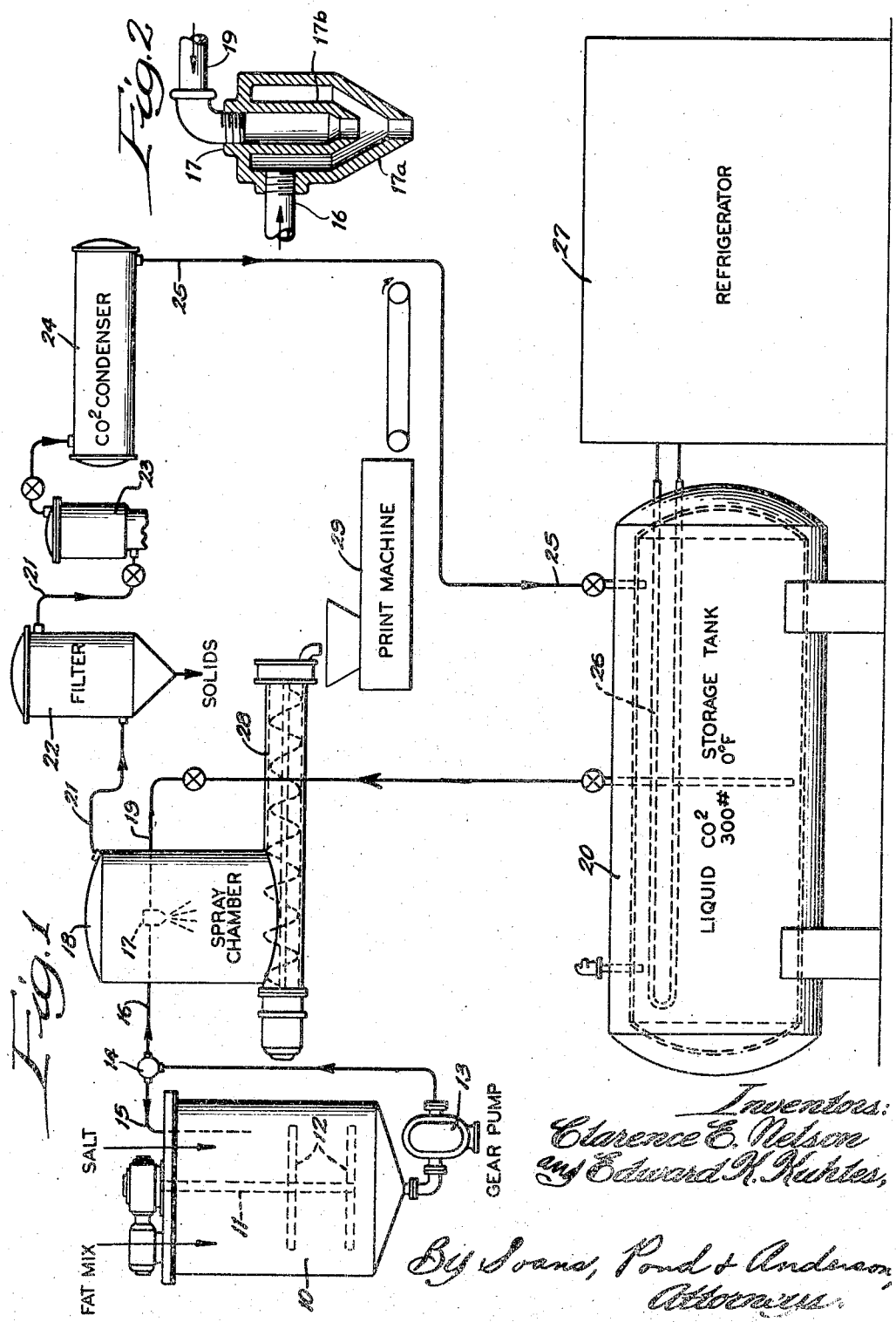

2,557,135

UNITED STATES PATENT OFFICE 2,557,135

MANUFACTURE OF EDIBLE PLASTICS

Clarence E. Nelson, Chicago, and Edward K. Kuhles, Wilmette, Ill., assignors to Kraft Foods Company, a corporation of Delaware Application February 10, 1945, Serial No. 577,260

2 Claims. (Cl. 99—118)

The invention relates to the manufacture of edible plastics, the word "plastic" as used herein meaning a material which has physical characteristics substantially equivalent to those possessed at ordinary atmospheric temperatures by such edible materials as butter, oleomargarine, lard, or by substitutes for such materials. It is of particular value in connection with the manufacture of butter or butter substitutes.

The objects of the invention in general are to produce an article of substantially similar composition and physical characteristics as are normally possessed by an edible plastic material of the general class described, the method of manufacture being more efficient and more hygienic than the existing methods of making similar materials, while the product itself is of superior quality.

General method

In general, it may be stated that the first step in the improved method comprises the preparation of a material having the same composition, so far as ingredients and other percentages are concerned, as is desired for the final product. This initial starting material, in the case of finished products such as butter or oleomargarine, will be made up of such ingredients that the mix will contain the lawful percentage of oil or fat, according to present regulations at least 80% of edible oil or fat, together with some water, milk solids, salt, and material to impart the desired flavor.

If butter is to be the desired end product, the starting material will contain about 80% of milk fat, about 16% of water, about 2% of salt, and 1 or 2% of milk solids (other than fat).

In the case of oleomargarine, the starting material will normally contain about 80% of an animal or vegetable fat or a blend of such materials, adjusted so that the melting point of the mix will be about 95° F. If available, cocoanut oil (which has a relatively high melting point) may be desirably employed, whereas if other more liquid oils are employed, the melting point may be raised by hydrogenation, according to well known methods. In any case, the final percentage of fat or oil will be about 80% in order to conform with the existing standards.

The second step of the process is to subject the starting material to such temperature as will convert it into liquid form or a form in which it is sufficiently liquid so that it can be pumped through relatively small conduits without excessive loss of pressure.

The fluid material is then atomized or sprayed and contemporaneously (meaning at the same time or immediately thereafter) the material is brought down to a temperature so that it promptly solidifies in the form of very small solid particles.

The solidified particles or material, while maintained at a temperature substantially below the melting point of the material, are then mechanically worked together or kneaded to form a plastic mass having the physical characteristics desired in the end product.

Desirably, the finished end product is converted or sub-divided into merchantable units which may be kits or prints in the case of butter or butter substitutes such as oleomargarine.

In the atomizing step of the process various methods of spraying and contemporaneously reducing the temperature of the material may be employed. For example, the material may be sprayed through a fine orifice into a refrigerated atmosphere or zone in which the temperature is maintained at an extremely low point, for example, in the neighborhood of 0° F., more or less.

Good results can be obtained by the use of an innocuous liquid which normally evaporates at a very low temperature, this liquid being combined with the mix at the time of spraying, preferably through the use of some conventional form of mixing nozzle resembling that used in spray guns for applying paint or the like.

Such a liquid is preferably kept under considerable pressure and maintained at a relatively low temperature in order to keep it in liquid form and when it issues from the spray nozzle it is converted into a gas, the heat necessary to evaporate the coolant liquid being supplied by the latent and sensible heat of the liquid fat, so that the evaporation of the coolant liquid will result in the solidification of the particles of fat formed by the spraying operation.

In practicing the liquid coolant spray method just described, good results are obtained with the use of liquid $CO_2$, which incidentally is believed to have the further advantage that the $CO_2$ gas involved during the spraying operation serves to displace a substantial percentage of air, oxygen or other undesired gaseous materials which would otherwise carry over into the finished end product.

Still another method involves a spraying of the mix under heavy pressure into a chamber maintained at a very low absolute pressure by powerful vacuum pumps, the absolute pressure being in the neighborhood of about ½ inch of mercury so that if any water is present in the chamber the temperature in the chamber will be in the neighborhood of 55° F.

The effect of spraying the liquid fat mix (which contains a fairly large percentage of water), is to cause sufficient water to evaporate to bring the temperature down to the temperature of equilibrium at the particular absolute pressure maintained in the chamber, which at ½ inch of mercury would, as stated, bring the temperature down to about 55° F. When the temperature of the liquid mix is brought down to 55° F., a temperature substantially below the melting point of the fat, there is a heat transfer. The latent heat of solidification of the oil and the specific heat evolved in lowering the temperature of the mix from 100° F. or more to 55° F. is absorbed or used in evaporating a part of the moisture in the mix. Or, to put it another way, the evaporation of part of the water in the mix serves to reduce the temperature of the mix and at the same time solidify the fat.

When using the vacuum method of operation just described, it is of course necessary to remove a large volume of water vapor in order to maintain the relatively high vacuum. Consequently, a rather extensive and expensive vacuum producing equipment is required. However, this requirement, in part at least, can be overcome by condensing or absorbing the water vapor before removing it from the zone of vacuum.

It will be obvious that when using the spray vacuum method last described, a certain amount of water will be abstracted from the material and therefore it will be advisable to prepare a mix which contains a sufficient additional amount of water in order to make up for the deficiency caused by the loss of moisture in the vacuum chamber.

If desired, instead of using only one of the various methods above referred to, a combination of different methods may be employed.

*Specific example*

In order to illustrate at least one method of practicing the aforesaid general method which has been used quite successfully, reference may be had to the accompanying drawings, in which Fig. 1 is a flow sheet of the $CO_2$ atomizing method heretofore described in connection with the general method and Fig. 2 is an enlarged cross section of the spray head.

The tank 10 is used as a receiver or reservoir for the liquid mix. The salt ingredient may be supplied at this point or, if desired, the salt may be added to the mix before the latter enters the reservoir tank. The latter method is preferable in the event that continuous operation is desired.

The supply tank 10 is equipped with a motor-driven axially vertical shaft 11 equipped with agitators 12 so that the mix may be continuously stirred and rendered of uniform blend before it is passed along for subsequent treatment. Means, not shown, are provided to maintain the temperature of the tank contents at about 100°, or slightly higher, the temperature being above the melting point of the fat ingredient. The bottom of the tank is equipped with an outlet which communicates with a gear-type pump 13, or any other positive type of pump capable of developing considerable pressure.

From said pump the material is conducted to a regulating valve 14, from which valve part of the material passes into the overflow or by-pass pipe 15 which serves to recycle part of the material through the reservoir tank. The remainder of the material supplied by the pump 13 is conducted through a pipe 16 to a spray head represented by the numeral 17. Said spray head, as indicated in Fig. 2 of the drawings, is of the conventional type such as may be conveniently used for spraying paint or similar materials, and is located within the spray chamber 18. Said spray head 17 is made with an outer casing which terminates in an outer nozzle 17a and is also formed with an interior nozzle 17b coaxial with the nozzle 17a and of such diameter as to provide a space between the inner and outer nozzles, so that, when liquid $CO_2$ is forced through the inner nozzle and emerges through the opening in the outer nozzle, it will entrain with it, and form a spray out of any liquid material which has been introduced into the annular space between the inner and outer nozzles through the pipe 16.

To said spray head 17 there is connected a liquid $CO_2$ supply pipe 19, communicating with a liquid $CO_2$ storage tank 20, containing a supply of liquid $CO_2$ at a temperature of about 0° F. and at a pressure of about 300 lbs. per square inch.

On account of the fact that liquid $CO_2$ is fairly expensive and a considerable amount of it must be used in order to supply the cooling effect necessary to congeal the oil in the mix and to reduce the temperature of the mix from above the melting point to about 55° F., it is advisable to salvage and recycle the $CO_2$ which is employed in the process. To this end the top of the spray chamber 18 is vented through a pipe 21, some place in the run of which there is inserted a filter or settling chamber 22 which serves to settle out any solids which may be withdrawn from the spray chamber through pipe 21. The $CO_2$ salvage pipe 21 is connected to a $CO_2$ compressor 23 which discharges into a $CO_2$ condenser 24. The liquid $CO_2$ formed in the condenser 24 discharges through pipe 25 into the liquid $CO_2$ storage tank 20.

It will be understood that since liquid $CO_2$ should be maintained at a temperature of about 0° F. in order to prevent the development of too heavy pressures within the system, it is advisable not only to insulate the tanks and piping which contain the liquid $CO_2$, but it is also advisable to refrigerate the contents of the liquid $CO_2$ storage tank. This may be done by employing within the tank 10 a refrigerating coil or coils 26, through which is circulated any convenient type of refrigerating liquid supplied by refrigerator 27.

At the bottom of the spray chamber 18 there is located a discharge device comprising in the present instance a worm or a double worm 28. The solid spray particles formed by the spraying operation and which fall into the bottom of the chamber, are received in the mouth of the screw conveyor 28 and as said screw conveyor 28 revolves the particles are worked together and kneaded or plasticized so that by the time the material reaches the right-hand or discharge end of the screw conveyor 28 there has been produced a mass of material having substantially the same characteristics as a good grade of butter. In fact, it is butter if cream has been used as the starting material.

After the material is discharged by the screw conveyor 28, it may be put into commercial form by packing into tubs or it is shaped into prints of uniform size and weight and these prints are wrapped and packaged in any conventional manner, i. e., in the same manner as butter or oleomargarine. Such operation is ordinarily effected in what is termed a print machine indicated at 29 in the drawings.

We claim:

1. A method of manufacturing an oleaginous edible plastic substance which comprises preparing a material containing about 80% of an edible fat which is normally non-liquid at normal atmospheric temperatures but which can be liquefied at temperatures considerably below 212° F., heating said material so as to liquefy the fat and thereby render the material capable of flowing, then mixing said heated material with an innocuous liquid, said innocuous liquid being capable of evaporating at a pressure which is lower than the pressure at which said innocuous liquid and said heated material are mixed and at a temperature which is below the point of solidification of said edible fat, then spraying the mixture of said heated material and said innocuous liquid into a chamber which is maintained at a pressure which is below the pressure at which said innocuous liquid evaporates, thereby contemporaneously reducing the temperature of the material to a point considerably below its liquefying temperature so as to convert the material into a finely divided solid and, then mechanically working the solid particles to form a coherent plastic mass.

2. A method of manufacturing an oleaginous edible plastic substance which comprises preparing a material containing about 80% of an edible fat which is normally non-liquid at normal atmospheric temperatures but which can be liquefied at temperatures considerably below 212° F., heating said material so as to liquefy the fat and thereby render the material capable of flowing, then mixing said heated material, under pressure, with liquid $CO_2$, then spraying the mixture of said heated material and liquid $CO_2$ into a chamber which is at about atmospheric pressure, thereby contemporaneously reducing the temperature of the material to a point considerably below its liquefying temperature so as to convert the material into a finely divided solid, and then mechanically working the solid particles to form a coherent plastic mass.

CLARENCE E. NELSON.
EDWARD K. KUHLES.

REFERENCES CITED

The following references are of record in the file of this patent:

UNITED STATES PATENTS

| Number | Name | Date |
|---|---|---|
| 328,024 | Grant | Oct. 13, 1885 |
| 376,495 | Von Roden | Jan. 17, 1888 |
| 1,144,539 | Grelck | June 29, 1915 |
| 1,406,381 | Heath et al. | Feb. 14, 1922 |
| 1,507,426 | Reynolds | Sept. 2, 1924 |
| 1,944,857 | Atwell | Jan. 23, 1934 |
| 1,958,975 | Reynolds et al. | May 15, 1934 |
| 2,150,943 | Sharples | Mar. 21, 1939 |

FOREIGN PATENTS

| Number | Country | Date |
|---|---|---|
| 521,715 | Great Britain | May 29, 1940 |